United States Patent [19]
Norman

[11] 3,769,713
[45] Nov. 6, 1973

[54] EXTERNAL CAN SEAM CHECKING APPARATUS

[76] Inventor: Patrick S. Norman, 8259 E. Sheffield, San Gabriel, Calif. 91775

[22] Filed: Nov. 27, 1970

[21] Appl. No.: 93,036

[52] U.S. Cl............. 33/174 L, 33/143 R, 33/169 B, 33/172 B
[51] Int. Cl. ............................................. G01b 5/02
[58] Field of Search .................. 33/174 L, DIG. 17, 33/143 R, 147 R, 174 Q; 209/80

[56] References Cited
UNITED STATES PATENTS
1,319,361  10/1919  Rouanet............................ 33/147 R
2,030,237  2/1936   Brittain........................... 33/DIG. 17
3,270,423  9/1966   Birrell et al. ..................... 33/174 L FOREIGN PATENTS OR APPLICATIONS
623,054    7/1961   Canada ............................. 33/174 L
1,410,091  7/1965   France ............................. 33/174 L
585,575    2/1947   Great Britain .................... 33/174 L Primary Examiner—Robert B. Hull
Attorney—J. Carroll Baisch

[57]                ABSTRACT

Apparatus for simultaneously measuring the seams and overall height of cans. The apparatus includes mechanisms for externally measuring the seam thickness, seam height, counter sink depth and the overall height of cans, simultaneously.

9 Claims, 6 Drawing Figures

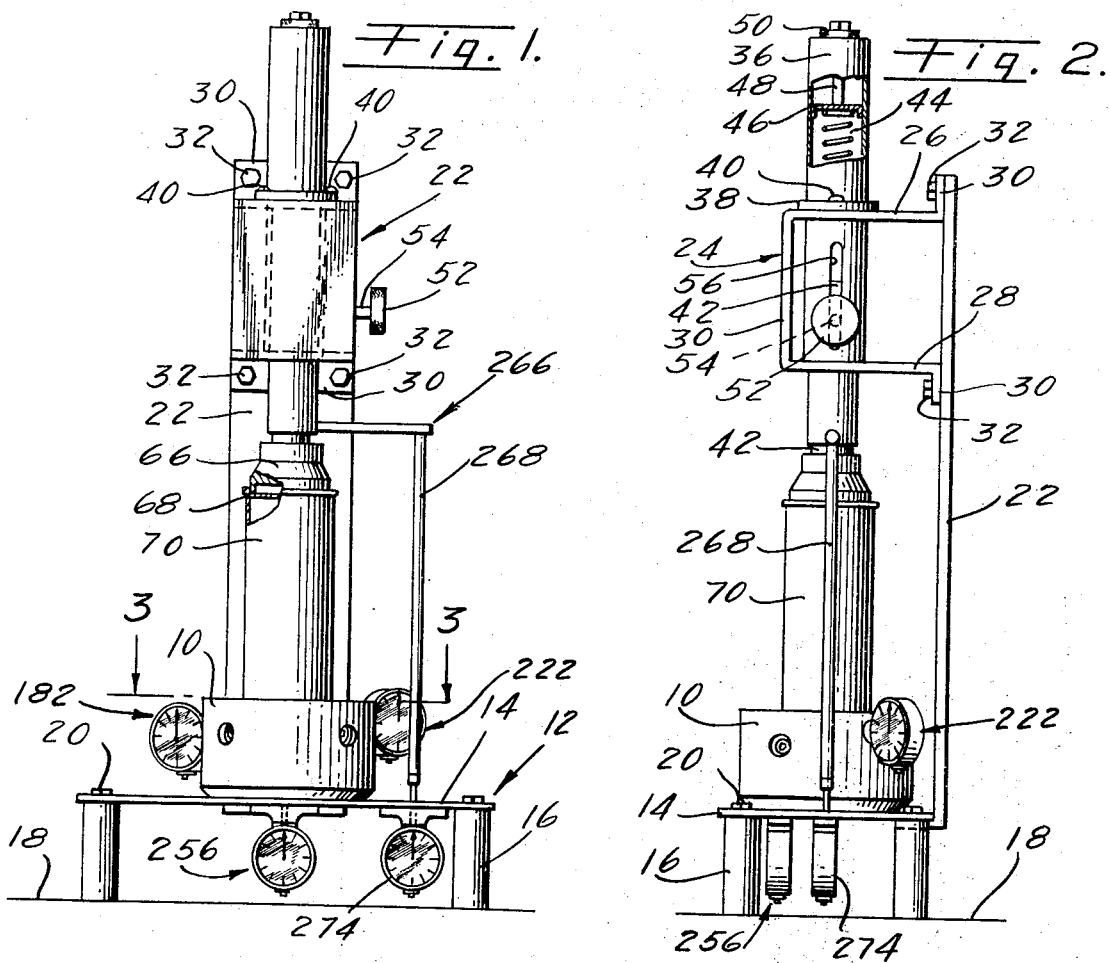
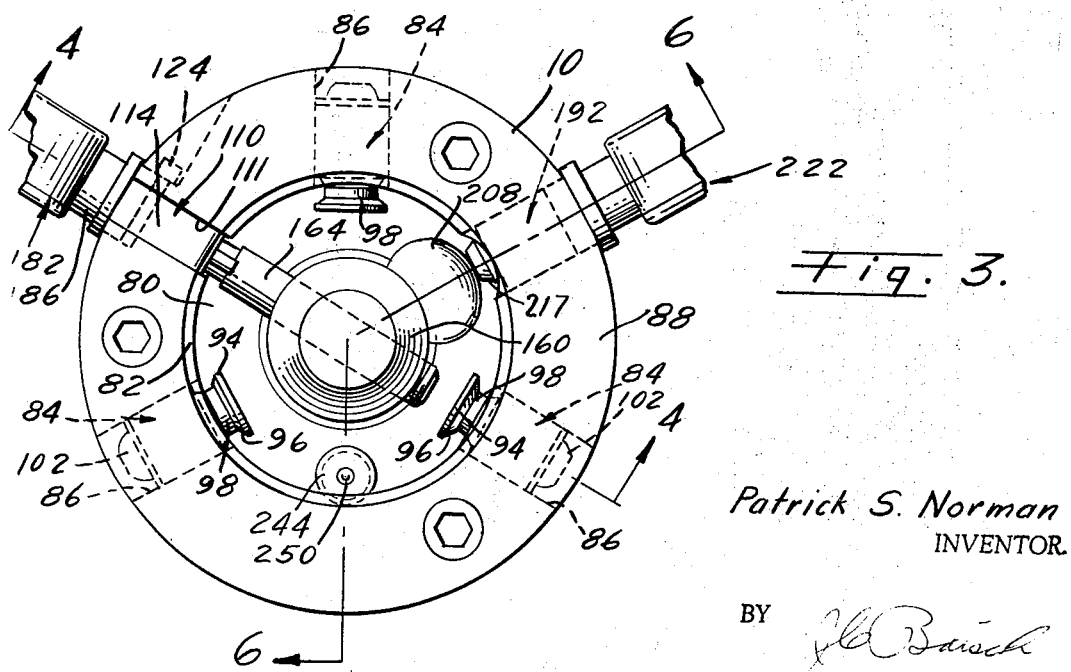

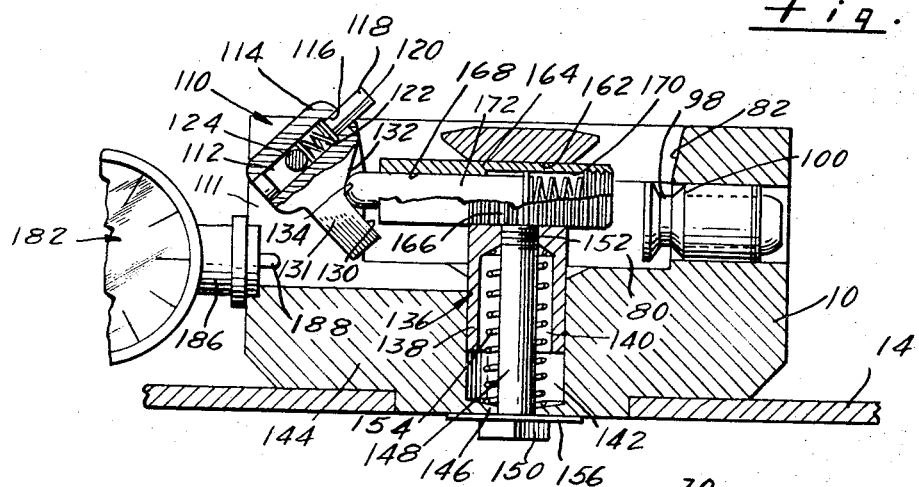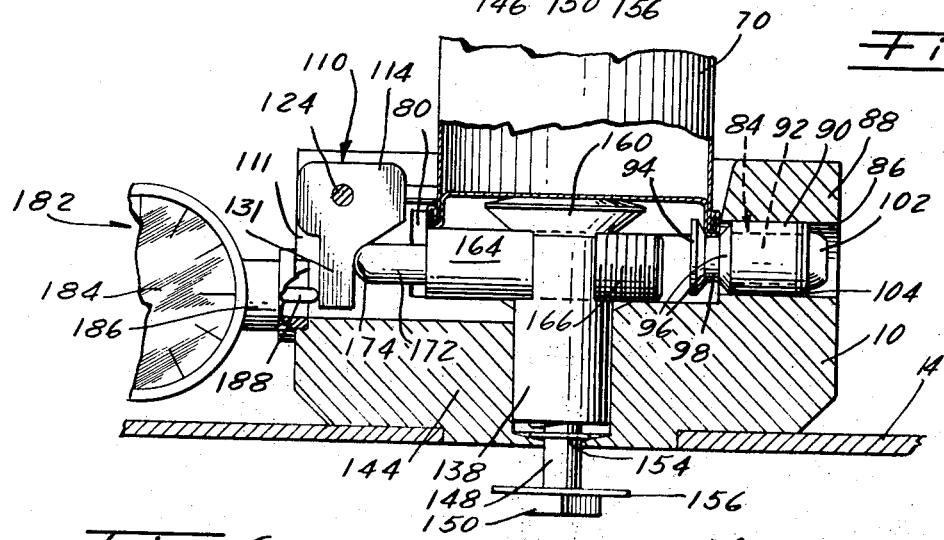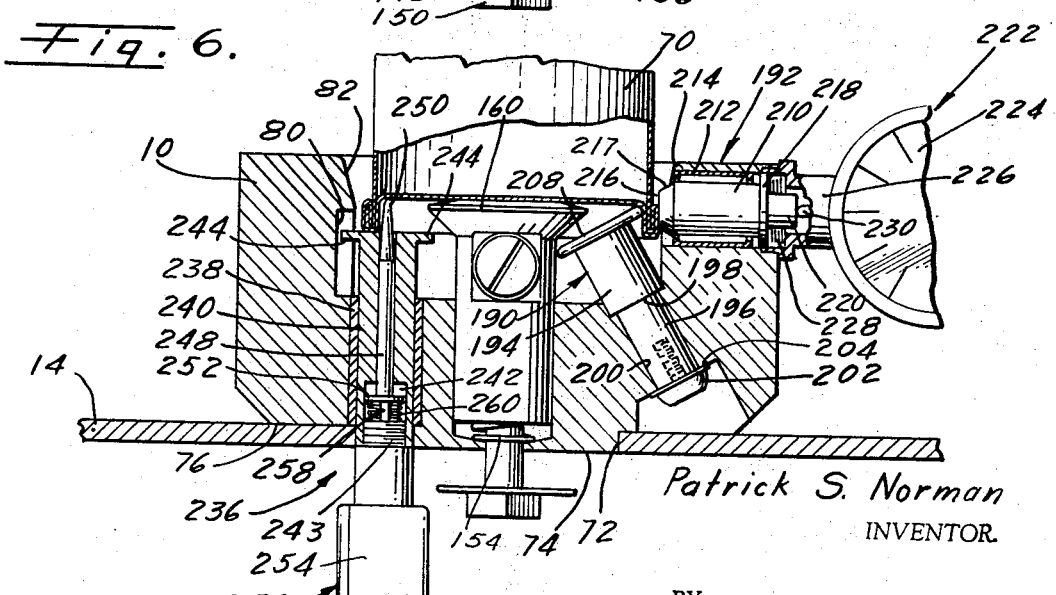

EXTERNAL CAN SEAM CHECKING APPARATUS

BACKGROUND OF THE INVENTION

1. Field of the Invention

The invention relates generally to apparatus for checking or testing and/or inspecting formed sheet metal articles and relates particularly to apparatus for checking, testing and/or inspecting the seams of metal cans or the like and, particularly, cans having double seams.

2. Description of the Prior Art

Various means are known in the prior art for checking, testing and/or inspecting can seams but these use separate instruments and, in many instances, manual micrometers or the like are used and only spot checks are made of the seams and depth of the counter sink. Since the seam dimensions may vary at different places, the checks do not necessarily provide the accurate results that are required. Thus, the same inspector could get different readings from two or more checks and different inspectors could also get results that differ.

Also, skilled persons are required to make such tests but these difficulties are encountered by such skilled inspectors.

SUMMARY OF THE INVENTION

The present invention has a base with the measuring of instruments incorporated therein.

The base has a central recess into which the lower end of a can to be tested or inspected is disposed, there being stop means for accurately positioning the lower end of the can, the can being rotatable on said stop means. Parts of the various measuring instruments project into the recess and each of such instruments includes a measuring indicator such as, for example, a dial indicator.

There is a measuring instrument for measuring the height of the seam to be measured, an instrument for measuring the thickness thereof, and an instrument for measuring the depth of the counter sink.

These instruments operate simultaneously and, as the can is rotated, the various measurements are made and recorded on the dial indicators. With one revolution of the can there is a complete or 100 percent reading on the seam thickness, seam height, and the counter sink depth. At the same time, there is instrumentation for measuring the length or height of the cans.

OBJECTS AND ADVANTAGES OF THE INVENTION

It is, therefore, an object of the invention to provide apparatus which will simultaneously measure the height and thickness of can seams, measure the depth of the counter sink, and measure the length or height of the can.

It is another object of the invention to provide apparatus of this character which will measure the height and thickness of seams and the depth of counter sink throughout their entire length or extent, this being effected by rotating the can as the measurements are being taken.

It is still another object of the invention to provide apparatus of this character which will measure the can from the counter sink depth at one end of the can to the other end of the can itself.

Still another object of the invention is to provide apparatus of this character which will show any variations in the thickness and/or height of the seam and will also show any variations in the depth of the counter sink.

It is a further object of the invention to provide apparatus of this character which will provide positive measurements that will be accurate and such measurements will be the same upon repeating the tests.

It is a still further object of the invention to provide apparatus of this character with which unskilled persons may make accurate and reliable tests and measurements.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a front elevational view of apparatus embodying the invention;

FIG. 2 is a side elevational view thereof;

FIG. 3 is a view taken on line 3—3 of FIG. 1;

FIG. 4 is a sectional view taken on line 4—4 of FIG. 3 showing the means for sensing or measuring the thickness of the seam in the inoperative position;

FIG. 5 is a similar sectional view showing the means for sensing or measuring the thickness of the seam in the operative position; and FIG. 6 is a sectional view taken on line 6—6 of FIG. 3.

DESCRIPTION OF THE PREFERRED EMBODIMENT

Referring more particularly to the drawings, there is shown apparatus embodying the present invention, comprising a base 10 which is supported by any suitable means. For example, said supporting means comprises a table, indicated generally at 12, and including a plate 14 having legs 16 which space the plate upwardly of a surface 18 upon which the apparatus is carried or supported. The legs may be secured to the plate 14 by any suitable means, such as, for example, screws 20.

Secured to the plate 14 and at the rear thereof is an upstanding standard 22. At the upper end of the standard 22 is a bracket, indicated generally at 24, in the general shape of a U lying on its side, said bracket having top and bottom horizontal arms 26 and 28, respectively, and a connecting part 30, the arms 26 and 28 being vertically spaced apart and said arms are provided with oppositely-extending ears 30 normal to said arms, whereby the bracket is secured to said standard 22 by means of screws 32.

The upper arm 26 of the bracket 24 has an opening therethrough for reception of a sleeve 36, the lower end of which is received in an opening provided therefor in the arm 28. Sleeve 36 has an external, radial flange 38 which rests on the upper surface of the arm 26 and is secured thereto by screws, or the like, 40.

Slidable longitudinally within the sleeve 36 is a plunger 42 urged downwardly by a spring 44 within said sleeve. Spring 44 reacts between a spring retainer 46 at the lower end of a screw 48 and the upper end of the plunger 42. A lock nut 50 holds screw 48 in adjusted positions.

Plunger 42 is raised against the force of spring 44 by means of a knob 52 of a screw 54, said screw 54 being slidable in a longitudinally-extending notch 56 in the sleeve 36. The downward spring urged movement of the plunger 42 is limited by engagement of the screw 54 with the lower end of the notch 56.

At its lower end the plunger is provided with an inverted cup or can engaging member 66 which is rotatably mounted to the plunger by any suitable, well known means. Inverted cup 66 is hollow and has a depending flange 68 which is adapted to fit into the counter sink of the upper end of a can to be tested, a typical can being indicated at 70.

Plate 14 of the table 12 has an opening 72 therethrough adjacent the center thereof, said base having an annular depending boss 74 which is received in said opening 72. The bottom 76 of the base rests on the plate and said base is secured to the plate 14 by any suitable means such as screws, not shown. The base may be secured to the plate by other means such as, for example, welding, brazing or the like.

Base 10 has an axial recess 80 therein having a lower part that is cylindrical and an upper portion 82 of which flares upwardly and outwardly to facilitate insertion of cans to be tested or checked into said recess 80.

There are a plurality of stop or can supporting means constituted by shafts or rollers, indicated generally at 84, each of which is disposed in a radial bore 86 in the annular wall 88 defining the recess 80. Bores 86 are annularly spaced apart and any suitable number of bores may be provided. There are three disclosed which are spaced apart at equal distances. Each bore 86 has a bushing 90 press fitted thereinto, although such bushings may be otherwise secured in the respective bores. The bushings 90 have axial bores therethrough for reception of a body portion 92 of the can supporting shafts 84. Each of the can supporting shafts has an enlarged head 94 at the inner end with an annular groove therein, the side walls 96 of which flare outwardly, the bottom 98 of the groove serving as a seat for the bottom rim of a can to be tested. The body portion 92 of the can supporting shaft is longer than the bushing 90 and there is a shoulder 100 at the base or outer end of the head 94. At the outer end the body or body portion 92 has a tapped bore, not shown, extending longitudinally therein for reception of a screw 102 on which there is a washer 104 which engages the adjacent end of the body portion 92. With this arrangement these can supporting shafts 84 have a limited longitudinal movement or radial movement relative to the recess 80 to better accommodate seating of cans in the groove of the head 94.

There is means for measuring the height of the can seam, said means including a generally T-shaped lever, indicated generally at 110, operably disposed in a radial slot 111 and having a bore 112 extending longitudinally in the cross piece 114 of the T, said bore having a reduced diameter part 116 at the inner end for slidable reception of a plunger 118. Plunger 118 has an enlarged head 120 that is adapted to engage a shoulder at the inner end of the large part of the bore 112, to limit movement of said plunger by a spring 122 reacting between said head 120 and a pivot pin or screw 124 on which the lever 110 is pivotally mounted. An inner end portion of the plunger 118 extends into the recess 80 and when the lever 110 is moved to the operable position the free end of said lever contacts the adjacent side of the can and said plunger laterally engages the upper edge of the seam.

The lever 110 is arranged radially relative to the recess 80 and is movable radially relative to said recess. The inner edge of the lever 110 provides an obtuse shaped cam having a part 130 along the inner edge of the stem 131 and a part 132 angling upwardly and inwardly from the part 130, said cam parts being smoothly connected by a curved part 134.

Coaxially with the recess 80 is a mechanism, indicated generally at 136, adapted to be engaged by a can for actuating said lever 110 and said mechanism comprises a post 138 having a longitudinal bore 140 extending upwardly from the lower end, said post being slidably disposed in an axial bore 142 in the bottom 144 of the recess 80. Bore 142 has a bottom wall 146 which has an axial opening therethrough for reception of a screw or bolt 148 extending through the bore 140, said screw 148 having a head 150 at its lower end and a threaded portion 152 at its opposite or upper end which is screwed into a tapped bore provided therefor in the post 138 at the upper end of the bore 140 of said post. There is a spring 154 about the screw 148 which reacts between the wall defining the upper end of said bore 140 and the wall 146 at the lower end of bore 142 for urging the mechanism 136 upwardly. Upward movement of the mechanism is limited by engagement of the head 150 and a washer 156 on the screw beneath the wall 146 with said wall 146.

At the upper end of the post is an enlarged flared seat 160 having a flat upper surface, upon which a can is adapted to sit. Just below the seat 160 is a tapped cross bore 162 in the post 138 in which an externally threaded guide 164 is screwed. Guide 164 has an axial bore portion 168 and an enlarged bore portion 170. A rod 172 is slidable in the bore portion 168, said rod having an outer end portion which extends outwardly of the guide and radially of the recess 80. At its outer end the rod has a rounded top 174 while at its inner end said rod has an enlarged head 176 which is slidable in the enlarged bore portion 170. A portion of the enlarged bore portion 170 at the open end is tapped for reception of a threaded plug 178, and between said head 176 and plug 178 is disposed a spring 180 which yieldingly urges the rod 172 outwardly and into engagement with the inner edge of the lever 110, it being understood that the rod 172 is at all times aligned with the inner or cam edge of the lever 110.

The mechanism for measuring the height of a can seam also includes a dial indicator, indicated generally at 182, having a dial part 184 from which extends a stem 186, the outer end of which is secured by any suitable means in an opening provided therefor in the base so that the free end of pin 188 of said dial indicator is positioned to be operably engaged by the stem 131 of the lever 110 when the latter is in operable position, as shown in FIG. 5. When the lever 110 is in its inoperative position (FIG. 4) the stem 131 of lever 110 is spaced from said free end of pin 188.

Normally, the mechanism 136 is in its upper position, as shown in FIG. 4 with the rounded end or tip 174 at the curved cam part 134, but acting on the lower end of the cam part 132, so that the lever 110 is moved to its inoperative position, shown in FIG. 4. When a can is placed on the seat 160 and pushed downwardly, the mechanism 136 is pushed downwardly causing the rod 172 to move the lever 110 clockwise to the position shown in FIG. 5 whereat the stem 131 of the lever 110 operably engages the pin 188.

When the can is in the position shown in FIG. 5 the rim of the can is seated on the bottoms 98 of the grooves in the heads 94 of the can supporting or stop means 84 and the free end of the plunger 118 engages the upper edge of the adjacent or bottom seam of the can so that when the can is rotated the height of the seam between the fixed bottoms 98 of the grooves and the free end of the plunger 118 is measured entirely around the can and any pivotal movements of the lever 110 will be recorded on the measurement indicator which has an indicator, not shown, but of well known character. Thus, the height of the seam is measured and recorded and any variations will be instantly shown or recorded on the dial 184 when the can is rotated.

Upon removal of the can, the mechanism 136 will be moved upwardly by spring 154 which in turn will cause rod 172 to rotate the lever 110 in a counterclockwise direction to its inoperative position, shown in FIG. 4.

Means for measuring the thickness of can seams comprises an inner or backing means, indicated generally at 190, and a slidably movable outer means, indicated generally at 192.

The backing means has a body 194 with a reduced diameter portion 196, there being a shoulder 198 at the lower end of the body 194 from which the reduced diameter portion 196 extends. The latter portion is rotatably disposed in a bore 200 in the base 10, said bore being inclined upwardly toward the axis of the base 10 so that the backing means is similarly inclined. The shoulder 198 of the backing means rests on a shoulder of the base about the upper inner end of the bore 200 and there is a screw 202 in a tapped bore in the lower end of the reduced diameter portion 196. A washer 204 is disposed on the screw. When the latter is tightened the washer rests against the lower end of said reduced diameter portion 196. While the screw is tight, the reduced diameter portion 196 is slightly longer than the bore 200 so that the backing means 190 may rotate.

At the upper end of the body 194 there is a flange 208 of greater diameter than the diameter of the body 194, said flange having a rounded edge which is adapted to engage the inner side of the seam, the thickness of which is to be measured, as shown in FIG. 6. The position of the flange 208 relative to the inner side of the seam is fixed, although the backing means rotates with rotation of the can.

The slidably movable outer means 192 comprises a radial plunger 210 disposed in a casing 212 secured within a radial bore 214 in the wall 88 of the base. Plunger 210 has a frustoconical tip 216 at its inner end for engagement by the flat free end thereof with the outer side of the seam of the can being tested. The sloping walls 217 of the tip facilitate insertion of the can into position for measuring the width or thickness of the seam. The plunger extends outwardly of the outer end of the casing 212 and has a flange 218 from which there extends outwardly a reduced diameter part 220. A measurement or dial indicator, indicated generally at 222, has a dial 224 from which a stem 226 extends, said stem having a free end part which extends into an enlarged diameter part at the outer end of the bore 214, and there is an internal shoulder in said stem between which and the flange 218 there is a spring 228 for urging the plunger 210 inwardly. Inward movement of the plunger 210 is limited by engagement of the flange 218 with the outer end of the casing 212. The outer or free end of the reduced diameter part 220 of the plunger engages a pin 230 of the gauge or dial indicator so that longitudinal movements of the plunger effect corresponding movements of the pin for actuating the indicator of the dial mechanism. The outer means 192 and the dial indicator are suitably secured in the bore 214 by any well known means such as screws or the like, not shown.

With this mechanism the thickness of the seam is readily measured and any variations in such thickness as the can is rotated will be indicated on the dial or other recording mechanism.

Means is provided for measuring the counter sink depth and includes the mechanism indicated generally at 236. This mechanism includes a bushing 238 secured in a vertical bore provided therefor in the bottom wall 144 of the base and spaced from the axis of the recess 80. Within the bushing 238 is secured a guide 240 having a longitudinal bore therethrough with an enlarged diameter part 242 at the lower end. At its upper end, guide 240 has an external flange 244, while the lower end of said guide extends downwardly in an opening provided therefor in the plate 14, the lower end of the can being on the top of said guide when the can is in the position for being checked, as shown in FIG. 6.

Slidable within the bore through the guide is a rod 248 having a pointed upper end 250 and a flange 252 at the lower end slidable within the enlarged diameter part 242 of the bore through the guide.

Screwed into the lower end portion of the enlarged diameter bore part 242 is the free, externally-threaded end 243 of the stem 254 of a measurement or dial indicator mechanism, indicated generally at 256. The dial part of the mechanism is not shown but is of the same character as the dials hereinabove described. There is a pin 258 of the dial indicator mechanism that is engaged by the flange 252 of the rod 248, and a spring 260 reacts between the end of the threaded part 243 and the flange 252 to urge the rod 248 upwardly for engagement with the bottom of the counter sink of the can, the depth of said counter sink being registered on the dial of the indicator and any variations in such depth are registered on the dial when the can is rotated.

The height of the can is measured by the mechanism indicated generally at 266. There is an arm extending outwardly from the plunger 42 and from the arm there is a depending rod 268. The lower end of rod 268 engages a pin of a measurement or dial indicator mechanism having a dial 274 secured to the under side of the plate 14, there being an opening through said plate through which said pin operably extends. When a can is positioned with the lower end in the recess 80 and the bottom rim resting on the bottoms 98 of the grooves of the can supporting shafts 84 and the inverted cup 66 at its lower position, the effective height of the can will be indicated on the dial 274.

Thus, it will be apparent that four accurate external measurements for cans may be made simultaneously. Also it is obvious that the various measurements are made independently of the axis of the can.

The lower ends of the cans are placed in the recess 80 by raising the plunger 42 by its knob 52 against the force of spring 44 a sufficient distance. After the can is placed on the bottoms 98 of the can supporting means 84, the knob 52 is lowered, thereby lowering the cup 66, the flange 68 of said cup entering the counter sink. The can is held securely in operative position by spring 44 and may be rotated by hand. Alternative arrangements, not shown, for rotating the can may be used. Removal of the can is readily made by raising the plunger 42 sufficiently to clear the can.

While one type of measurment indicator mechanism is shown, it is to be understood that other types may be used, either mechanical or electrical, and these may operate automatically.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined by the accompanying claims.

I claim:

1. External can seam checking apparatus, comprising:
   A. a base;
   B. support means carried by the base for rotatably supporting and positioning a can in a gauging position;
   C. seam height measuring means carried by the base for measuring the height of an external can seam;
   D. said seam height measuring means including a can seat carried by the base and mounted for vertical movement relative to the base between an upper position and a lower position;
   E. spring means carried by the base urging the seat to its upper position;
   F. means limiting the spring urged movement of the seat;
   G. a lever;
   H. a pivot on which said lever is pivotally mounted on the base, said lever having a bore adjacent the upper end; said bore opening toward the can seat;
   I. a part of said lever depending below the pivot, the inner edge of said lever forming a cam;
   J. a plunger slidably disposed in and biased outwardly of said bore of the lever, the level having limiting outward movement of said plunger;
   K. a horizontal rod connected with the seat and movable vertically therewith, said rod being mounted for horizontal sliding movement relative to the seat;
   L. yielding means urging one end of said rod into operable engagement with the cam edge of the lever for effecting pivotal movement of said lever with vertical movements of said can seat;
   M. said lever being in an inoperative position when the seat is at its upper position and when a can is placed on the seat and pushed downwardly to a position whereat the lower end of the can rests on the support means, the rod effecting rotation of the lever to bring the plunger into lateral contact with the upper edge of said seam;
   N. and gauge means engaged by the lever when rotated to the position whereat the plunger engages the upper external edge of the cam seam for actuating the gauge to indicate the external height of the can seam.

2. The invention defined by claim 1, wherein there is means mounted on the base for measuring the thickness of the can seam, said means comprising seam backing means including a back-up member positioned to engage the inner side of a seam when the can is resting on the support means; and a radial plunger mounted for movement toward and away from the can seam when the can is on the support means; yielding means urging the inner end of said radial plunger into engagement with the outer side of the can seam; and a gauge operably connected with said radial plunger for indicating the thickness of the can seam.

3. The invention defined by claim 2, wherein the means for measuring the height of the seam and its thickness are mounted at spaced positions on the base to operate simultaneously when a can is disposed on said can seat and said can is moved onto the support means.

4. The invention defined by claim 3, wherein said radial plunger has a frusto conical can seam engaging end.

5. The invention defined by claim 2, wherein the back-up member is rotatable and the position of the back-up member relative to the inner side of the seam is fixed.

6. The invention defined by claim 1, wherein the support means carried by the base comprises a plurality of annularly spaced shafts arranged radially and having limited radial movement, each of said shafts including a free end portion at the inner end, said free end portion having a generally V-shaped groove therein with a flat bottom on which the free end of a can seam is adapted to rest when the can is moved downwardly to move the seat to its lower operable position.

7. The invention defined by claim 2, wherein there is means mounted on the base for measuring the depth of the can counter sink, said means comprising a further plunger engagable with the bottom of the counter sink when the can is on said support means, and a counter sink measurement indicator having an operable connection with said further plunger; and variations of the depth of the counter sink being indicated by the indicator as the can is rotated.

8. The invention defined by claim 7, wherein the means for measuring the depth of the counter sink is effective simultaneously with the means for measuring the height and the thickness of the seam when the can is disposed on the seat and moved into engagement with the can support means.

9. The invention defined by claim 8, including means mounted on the base for measuring the height of the can, said last named means operating simultaneously with the means for measuring the height of the seam and the thickness of the seam by the movement of the can onto the support means.

* * * * *